Aug. 18, 1964 P. D. BREHM 3,144,718
RADIAL PLAY GAUGE
Filed April 5, 1961 2 Sheets-Sheet 1

INVENTOR
PAUL D. BREHM
BY *Pennie, Edmonds,*
*Morton, Barrows & Taylor*
ATTORNEYS Aug. 18, 1964    P. D. BREHM    3,144,718
RADIAL PLAY GAUGE
Filed April 5, 1961    2 Sheets-Sheet 2

INVENTOR
PAUL D. BREHM
BY
ATTORNEYS 3,144,718
RADIAL PLAY GAUGE
Paul D. Brehm, Keene, N.H., assignor to Miniature Precision Bearings, Inc., a corporation of New Hampshire
Filed Apr. 5, 1961, Ser. No. 100,961
5 Claims. (Cl. 33—174)

This invention relates to a measuring gauge and more particularly to a gauge for measuring radial play of antifriction bearings.

Antifriction bearings must be designed so that radial play between inner and outer races is contained within predetermined limits. The radial play limits for miniature bearings of the size of ¼" outer diameter must be measured in terms of $1/10,000$ of an inch if the bearings are to accomplish the purposes for which they are designed.

In order to accurately measure the radial play of antifriction bearings, it is important that the play be measured under predetermined radial loads. A difficulty of conventional gauges has been to accurately apply the predetermined load or force to the bearing so that the force would be perpendicular to the rolling elements or balls separating the inner and outer races of the bearings. This has been especially a difficult problem when miniature bearings on the order of ¼" outer diameter are measured. If the predetermined load is not applied directly over the center of the races so that the line of force passes through the center of the balls and perpendicular to the longitudinal axis of the bearing, then there is a possibility that the balls will move laterally in their races which will then give an inaccurate reading of radial play between load and no load conditions as the races will move toward each other as the balls are moved laterally in the races. A further difficulty existing in conventional radial play gauges has been to provide a gauge from which radial play readings may be quickly and economically made over a number of segments of the outer race. It is conventional when taking radial play measurements to rotate the bearing assembly so that the predetermined load is applied in 60° increments around the outer race. It is, therefore, desirable to have a measuring gauge by which the bearing may be rotated in 60° increments with a minimum of set-up time.

I overcome the aforementioned difficulties by providing generally for a radial play gauge utilizing pneumatic means for centering the balls in the races to insure that accurate readings can easily be made when a predetermined load is applied to the outer race. Broadly my gauge comprises an arbor which fits accurately into the inner race of a bearing to be measured and which has thereon a shoulder which may engage one end face of the inner race. The arbor in turn has thereon means by which it may force the end face of the inner race against a holding device to secure it with respect to the holding device. The end faces of the outer race are securely clamped by means of a rotor clamp to a rotor which rotatably surrounds the arbor. The rotor itself is loosely contained within a close-fitting housing into which air under pressure is injected so that the air passes around the periphery of the rotor. The rotor is thus floated on the air and at no place touches the housing. In addition, a movement indicator is affixed to the gauge so that it contacts a portion of the rotor in order that movement of the rotor in a vertical direction may be determined after a load is applied to the rotor.

The instrument is set up so that the end faces of the inner race are securely engaged by the shoulder on the arbor and the frame of the gauge. The end faces of the outer race are then securely engaged by the rotor and rotor clamp. Pneumatic pressure is applied to the top of the housing under small pressure which together with the weight of the rotor, rotor clamp, and outer race allows the balls to automatically center in their races. At this point, the indicator is set to zero. Air under a predetermined pressure is then applied to the bottom of the housing which will lift the rotor, rotor clamp, and outer race so moving the indicator to give a measurement of radial play under a predetermined load. The air injected through the bottom of the housing is then shut off and the rotor turned 60° where air is again injected into the bottom of the housing to give a reading of radial play at the new position.

Referring to the drawings in which a preferred embodiment of my invention is shown, FIG. 1 illustrates a partial sectional front view of a radial play gauge constructed according to my invention;

Figure 1:
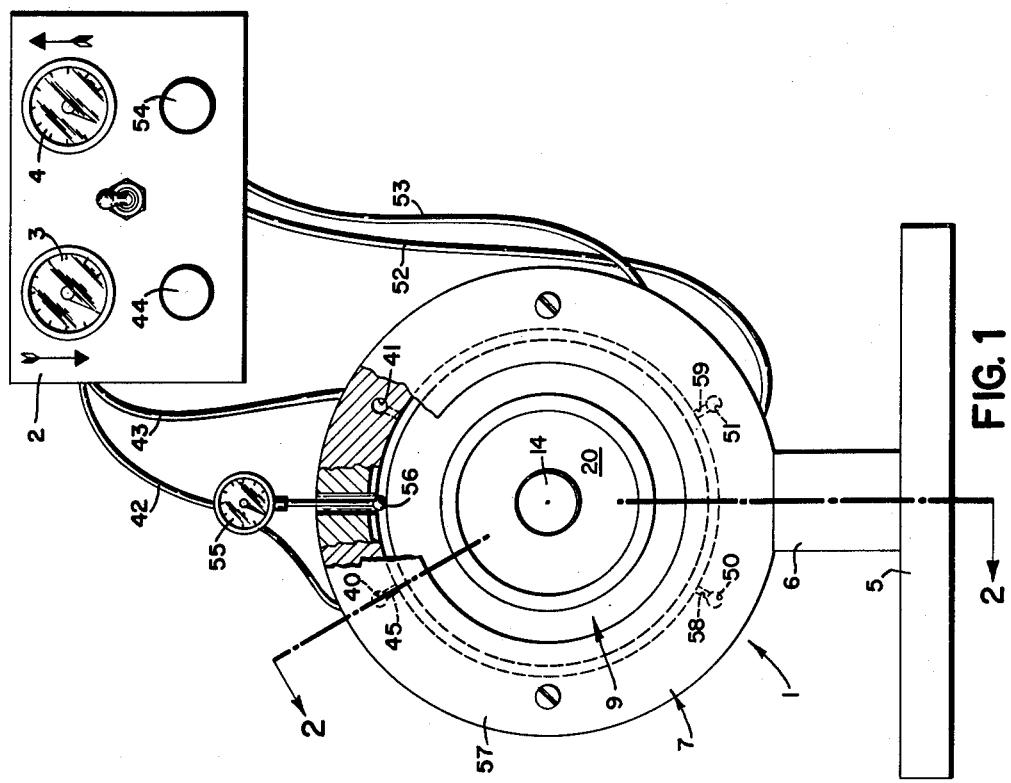

Referring to the drawings in detail and in particular to FIG. 1, 1 denotes generally a radial play gauge constructed according to my invention having an indicator board 2 on which are mounted pneumatic pressure gauges 3 and 4 which are adapted to read either in pounds per square inch of pneumatic pressure or in pounds of force. The gauge 1 comprises a stand 5 on which is mounted a pedestal 6 which in turn carries a housing 7 which has on the back thereof a circular backplate 8. A rotor 9 is loosely contained in the housing such that its outer peripheral surface is substantially symmetrical about the vertical axis of the ball elements of the bearing assembly being checked.

Figure 4:
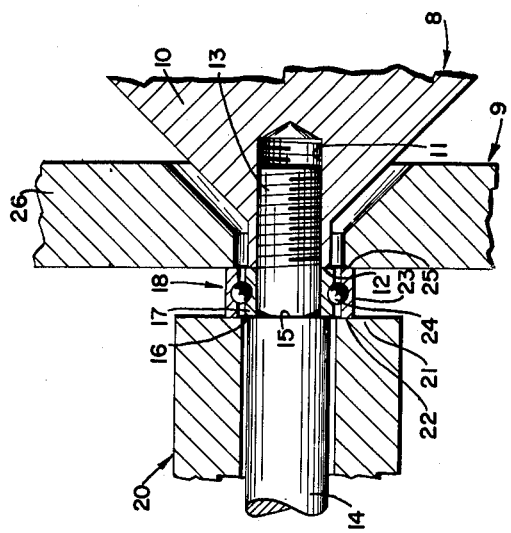
FIG. 4 is an enlarged view of a portion of FIG. 3 illustrating a bearing in the measuring position.

The backplate 8 has a conical portion 10 which terminates in a threaded hole 11 having a shoulder 12 on the end thereof as more clearly shown in FIG. 4. Threaded hole 11 is adapted to receive a threaded end 13 of an arbor or inner clamp 14. The threaded portion 13 is of less diameter than the arbor 14 so that a shoulder 15 is formed where 13 joins 14. Referring to FIG. 4, shoulder 15 is shown engaging an end face 16 of an inner race 17 of a bearing assembly denoted generally by 18. The other end face of inner race 17 engages shoulder 12 of the backplate 8.

A rotor clamp 20 is threaded into the rotor 9 so that its end 21 engages an end face 22 of an outer race 23 of the bearing assembly 18 where the outer race is separated from the inner race by roller elements or ball-bearings 24. The end face 25 of the outer race 23 is forced against a flange 26 contained in the rotor 9 so that the outer race is securely clamped to the rotor.

Figure 2:
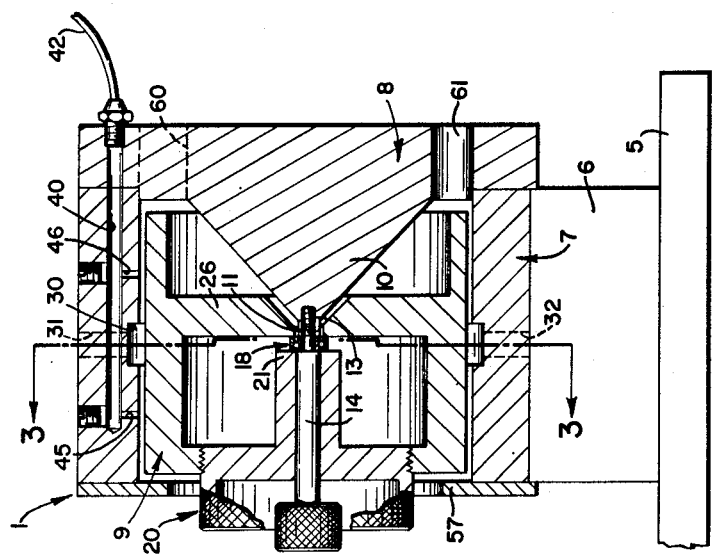
FIG. 2 is a sectional view of FIG. 1 taken along lines 2—2.

The housing 7 has therein an annular groove 30, the center line of which is substantially co-planar with the vertical axis of the ball elements when the ballbearing assembly is in the measuring position as shown in FIGS. 2 and 4. Exhaust ports 31 and 32 extend through the housing 7 to the groove 30. In addition, as shown in FIG. 3, the housing 7 has a pair of longitudinally extending grooves 33 and 34 which extend parallel to the center line of the rotor and bearing assembly.

The housing 7 also has therein upper bores 40 and 41 which are connected by means of conduits 42 and 43 through gauge 3 to a source of pneumatic pressure (not shown) and the pressure in the conduits is regulated by means of a knob 44. The bore 40 as shown in FIG. 2 is connected with the interior of the housing by means of nozzles 45 and 46, while bore 41 is connected by similar nozzles not illustrated. Air injected through nozzles 45 and 46 serves to center the balls in their races as more fully explained hereafter.

Figure 3:
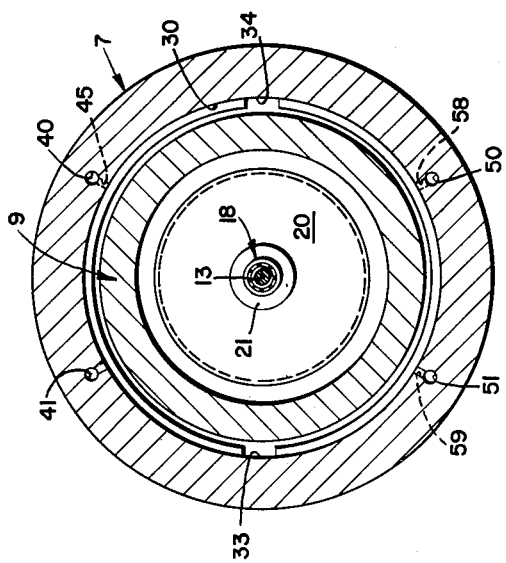
FIG. 3 is a sectional view of FIG. 2 taken along lines 3—3.

The lower part of the housing 7 has therein bores 50 and 51 as shown in FIGS. 1 and 3 which in turn are connected to a source of pressure (not shown) by means of conduits 52 and 53 through gauge 4. The pneumatic pressure in these conduits is regulated by a knob 54 and air injected through these conduits serves to apply the predetermined load to the outer race.

An indicator gauge 55 for measuring vertical movement of the rotor 9 is mounted in the housing and has an indicator point 56 which engages the upper part of the rotor.

In addition, the gauge has a cover plate 57 which is mounted on the open end of the housing 7 in order to keep the rotor from falling out of the gauge and also to regulate the flow of air from the open end of the housing as more fully explained hereafter.

The operation of my new radial play gauge is as follows: The inner race 17 of the bearing 18 of which it is desired to measure the radial play is initially inserted over the end 13 of arbor 14. The threaded end of arbor 14 is then screwed into the hole 11 of the backplate of the gauge so that the end faces of the inner race are securely clamped between the shoulder 15 on the arbor and shoulder 12 of the backplate. Rotor clamp 20 is then screwed into the rotor 9 so that its end 21 engages with the end face 22 of the outer race 23 to force the end face 25 into contact with the flange 26 of the rotor and so clamp the outer race to the rotor. The ball elements are then centered in their races by applying a predetermined force by means of pneumatic pressure on the top of the rotor so that a resultant force is applied in a downward direction substantially parallel to the vertical axis of the ball elements passing through their centers. This is accomplished by injecting air under a predetermined pressure through conduit 42 into bore 40 and out through the upper nozzles 45 and 46. The upper nozzles are mounted symmetrically about the rotor and the rotor is of a length such that its center line coincides with the vertical axis of the ball elements. The injected air escapes from the housing through exhaust ports 31 and 32, through the front of the housing around cover plate 57, and out through the rear of the backplate through exhaust ports 60 and 61 and in so doing, provides a balancing or positioning force to position the rotor so that its outer peripheral surface is symmetrical about the common diametral plane of the ball elements.

The resultant downwardly extending force, caused by the air being injected into the housing, thus coincides with the vertical axis of the ball elements as shown in FIG. 2. If the resultant force were not along the vertical axis of the ball elements but rather were slanted, then the outer race would be skewed with respect to the inner race and so cause the balls to move laterally in their races with the result that the races would move towards each other to give a false reading from which to measure radial play under no load conditions.

After the balls have been centered, indicator 55 is set to read zero. A predetermined load is then applied to the bottom of the rotor by injecting air under a predetermined pressure into conduits 52 and 53 which join with bores 50 and 51 contained on the bottom of the housing so causing a resultant upward force to be exerted on the rotor. The nozzles 60 and 61 are mounted symmetrically in the housing as are the upper nozzles to insure that the resultant force exerted on the rotor will be along a line co-axial with the vertical axis of the ball elements. This upper force will move the rotor and clamped outer race upward an amount equal to the radial play of the bearing for the particular load applied.

In order that the measurement obtained will be a true measurement of the radial play on the bearing in all positions, it is necessary to rotate the bearing in 60° increments and take a reading at each position. This is done by merely rotating the rotor 9 60°, centering the balls in their races by means of control 44 and then taking a reading of the bearing under a predetermined load which is applied by control 54. The readings may then be averaged to determine the radial play of the bearing under all positions.

While I have shown a preferred embodiment of my invention, it is understood that the gauge illustrated is capable of modification and that changes in its structure may be made without departing from the scope of my invention which is to be limited only by the following claims.

I claim:

1. A radial play gauge for measuring the radial play of a ballbearing assembly having an inner and outer race separated by ball elements lying in a common plane, comprising arbor means for affixing an end face of said inner race to said gauge, a rotor surrounding said outer race movable vertically and rotatable with respect to said gauge and positionable so that its outer peripheral surface is symmetrical about the common diametral plane of the ball elements, clamping means for clamping an end face of said outer race to said rotor, centering means for applying a predetermined resultant force on the upper part of said rotor in a direction in the common diametral plane of the ball elements, positioning means for applying a balancing force to position said rotor with respect to said gauge wherein its outer peripheral surface is symmetrical about the common diametral plane of the ball elements, a load means for applying a predetermined resultant load on the bottom part of said rotor in a direction in the common diametral plane of the ball elements, and an indicator means engaging said rotor for measuring vertical movement of said rotor under influence of said load means.

2. A radial play gauge for measuring the radial play between the inner and outer races of an antifriction bearing assembly separated by antifriction roll elements lying in a common plane, comprising arbor means for affixing an end face of said inner race to said gauge, a housing affixed to said gauge, a rotor surrounding said outer race in said housing movable with respect to said gauge, rotor clamping means for clamping an end face of said outer race to said rotor, an indicator engaging said rotor to measure the vertical distance moved by said rotor, positioning means for applying a balancing force to said rotor to position said rotor with respect to said bearing to be measured wherein the outer peripheral surface of the rotor is substantially symmetrical about the common diametral plane of the antifriction roll elements, a centering means for imparting a predetermined force downward on the top of said rotor along a line in the common diametral plane of the antifriction roll elements to center said roll elements in said inner and outer races, and a load means for applying a predetermined load to the bottom of said rotor in an upward direction along a line in the common diametral plane of the antifriction roll elements to move the rotor in an upward direction; said indicator measuring vertical movement of said outer race when said load means is applied to said rotor.

3. A radial play gauge according to claim 2 wherein said centering means comprises a source of compressed air, a plurality of nozzles in the upper part of said housing connected to said source through which pressurized air is injected into said housing to move said rotor in a downward direction, and said load means comprises a plurality of nozzles in the lower part of said housing connected to a source of pressurized air through which air is injected into said housing to move said rotor in an upward direction; said nozzles in said upper and lower parts of said housing being arranged symmetrically about the ball elements of the bearing assembly to be checked.

4. A radial play gauge according to claim 3 wherein said housing has an annular groove connected with exhaust ports positioned between adjacent nozzles through which pressurized air is partially exhausted from said housing.

5. A radial play gauge according to claim 4 wherein said housing has a plurality of longitudinally extending grooves connected with said annular groove through which pressurized air is partially exhausted from said housing.

References Cited in the file of this patent
UNITED STATES PATENTS

| | | |
|---|---|---|
| 2,525,068 | Ericson | Oct. 10, 1950 |
| 2,746,159 | Aller | May 22, 1956 |
| 2,783,543 | Riedel | Mar. 5, 1957 |
| 2,942,350 | Sloan | June 28, 1960 |